US010502220B2

(12) United States Patent
Adjan (10) Patent No.: US 10,502,220 B2
(45) Date of Patent: Dec. 10, 2019

(54) METHOD FOR IMPROVING TURBINE COMPRESSOR PERFORMANCE (71) Applicant: SOLAR TURBINES INCORPORATED, San Diego, CA (US)

(72) Inventor: Bachar Adjan, San Diego, CA (US)

(73) Assignee: Solar Turbines Incorporated, San Diego, CA (US)

(*) Notice: Subject to any disclaimer, the term of this patent is extended or adjusted under 35 U.S.C. 154(b) by 658 days.

(21) Appl. No.: 15/217,822

(22) Filed: Jul. 22, 2016

(65) Prior Publication Data
US 2018/0023591 A1 Jan. 25, 2018

(51) Int. Cl.
F04D 27/02 (2006.01)
F01D 9/04 (2006.01)
F01D 17/16 (2006.01)
F02C 7/042 (2006.01)

(52) U.S. Cl.
CPC ......... F04D 27/0246 (2013.01); F01D 9/041 (2013.01); F01D 17/16 (2013.01); F02C 7/042 (2013.01); F05B 2220/302 (2013.01); F05B 2230/237 (2013.01); F05B 2230/80 (2013.01); F05B 2240/12 (2013.01); F05B 2280/1071 (2013.01); F05B 2280/10741 (2013.01); F05D 2230/80 (2013.01); F05D 2250/90 (2013.01)

(58) Field of Classification Search
None
See application file for complete search history.

(56) References Cited

U.S. PATENT DOCUMENTS

| 3,377,799 | A | 4/1968 | Geyer |
| 6,986,639 | B2 | 1/2006 | Teramura et al. |
| 8,475,117 | B2* | 7/2013 | Andrew ............... F02C 7/1435 415/130 |
| 9,109,461 | B2 | 8/2015 | Takahashi et al. |
| 9,540,939 | B2* | 1/2017 | Maliniak .................. F02C 7/04 |
| 2008/0298973 | A1* | 12/2008 | Marini ................... F01D 5/147 416/223 R |

(Continued)

FOREIGN PATENT DOCUMENTS

EP 2730752 5/2014
WO 2008026788 A1 3/2008

Primary Examiner — Justin D Seabe
Assistant Examiner — Jason A Fountain
(74) Attorney, Agent, or Firm — Procopio, Cory, Hargreaves & Savitch LLP (57) ABSTRACT A method and device for retrofitting a gas turbine engine for improved hot day performance are disclosed. The method can include removing a first selected stator bladerow from the plurality of compressor stages, the first selected stator bladerow having a first inlet swirl angle and including a first plurality of fixed stator vanes. Each stator vane of the first plurality of fixed stator vanes can have a first stator vane angle. The method can also include providing a first improved stator bladerow to replace the first selected stator bladerow. The first improved stator bladerow can have a second plurality of fixed stator vanes, each having a second stator vane angle smaller than the first stator vane angle. The method can also include replacing the first selected stator bladerow with the first improved stator bladerow to produce an increased pressure ratio and flow rate compared to the first selected stator bladerow.

8 Claims, 4 Drawing Sheets (56) References Cited

U.S. PATENT DOCUMENTS

| | | |
|---|---|---|
| 2011/0110763 A1 | 5/2011 | Tecza et al. |
| 2012/0070267 A1 | 3/2012 | Takahashi et al. |
| 2012/0076658 A1 | 3/2012 | Jarrett, Jr. et al. |
| 2012/0163965 A1 | 6/2012 | Takahashi et al. |
| 2013/0004320 A1* | 1/2013 | Perret ................. F01D 5/005 416/223 R |
| 2013/0280053 A1 | 10/2013 | Micheli et al. |
| 2014/0064912 A1 | 3/2014 | Velampati et al. |
| 2014/0328675 A1 | 11/2014 | Derclaye et al. |

\* cited by examiner

METHOD FOR IMPROVING TURBINE COMPRESSOR PERFORMANCE

TECHNICAL FIELD

The present disclosure generally pertains to gas turbine engines, and is more particularly directed toward enhancing compression and thus the power of a gas turbine engine in certain conditions.

BACKGROUND

Gas turbine engines include compressor, combustor, and turbine sections. The compressor section includes inlet guide vanes and the turbine section includes a third stage power turbine nozzle. A fuel system generally provides fuel to the combustor. A control system may control the angle of the inlet guide vanes and the amount of fuel delivered to the combustor by the fuel system.

When a turbine compressor and a fixed engine operating line (set by a given hot section flow capacity) runs at hotter ambient conditions, the aerodynamic inlet corrected speed (or Acoustic rotational speed) can decrease to its design speed. This can force the front stages of the compressor to operate closer to the stall side of their characteristics while the rear stages may be forced to operate closer to the choke side of their flow characteristics. This can present sub-optimum operating characteristics and reduced power output.

The present disclosure is directed toward overcoming one or more of the problems discovered by the inventors or that is known in the art.

SUMMARY

An aspect of the disclosure provides a method for retrofitting a gas turbine engine for improved hot day performance. The gas turbine engine can have a plurality of compressor stages, each compressor stage of the plurality of compressor stages having a rotor bladerow and a stator bladerow. The method can include removing a first selected stator bladerow from the plurality of compressor stages. The first selected stator bladerow can have a first inlet swirl angle and including a first plurality of fixed stator vanes. Each stator vane of the first plurality of fixed stator vanes can have a first stator vane angle referenced to a central axis of the gas turbine engine. The method can also include providing a first improved stator bladerow to replace the first selected stator bladerow. The first improved stator bladerow can have a second plurality of fixed stator vanes. Each stator vane of the second plurality of fixed stator vanes can have a second stator vane angle smaller than the first stator vane angle. The method can also include installing the first improved stator bladerow in place of the first selected stator bladerow. The first improved stator bladerow can have a second inlet swirl angle less than the first inlet swirl angle to produce an increased pressure ratio and increased flow rate compared to the first selected stator bladerow.

Another aspect of the disclosure provides an improved stator vane assembly for increasing an efficiency of a compressor of a gas turbine engine. The compressor can have a first stator vane assembly selected for replacement. The first stator vane assembly can have a first plurality of fixed stator vanes. Each fixed stator vane of the first plurality of fixed stator vanes can have a first vane angle relative to a center axis of the gas turbine engine. The improved stator vane assembly can have an improved stator assembly ring having a central axis surrounded by an interior surface forming a cylindrical surface of revolution. The improved stator vane assembly can also have a plurality of perforations formed around an inner perimeter of the improved stator assembly ring. The improved stator vane assembly can also have a second plurality of stator vanes for insertion into the plurality of perforations, wherein each stator vane of the second plurality of stator vanes has a second vane angle less than the first vane angle when inserted into the plurality of perforations. The compressor can produce an increased power ratio and increased flow rate when the improved stator vane assembly is used in place of the first stator vane assembly.

DETAILED DESCRIPTION

The systems and methods disclosed herein include a gas turbine engine including a multi-stage compressor with variable inlet guide vanes, a combustor, and a turbine with multiple stages including a turbine nozzle and a turbine rotor assembly. The compressor can have variable guide vanes (VGV) and or inlet guide vanes (IGV) in the forward stages of the compressor. The compressor can also have multiple stages of fixed stator vanes (FSV) in the aft portion of the compressor. The gas turbine engine also includes a control system that may be used to control, inter alia, the rotation angle of the inlet guide vanes and the amount of fuel delivered to the combustor. In embodiments, the inlet swirl angle into the rotor of a particular stage of multiple compressor stages can be modified by replacing the fixed stator vanes in one or more compressor stages with fixed stator vanes with a different vane setting (stagger) angle. The vane setting or stagger angle can be implemented without further changes to the stators, such as, for example, airfoil shape, stage design, etc. Changes to a rotor inlet swirl angle of a particular stage have a direct (positive or negative) impact on the rotor flow, pressure ratio (PR), and efficiency and surge margin at a given speed. This can also have a corresponding impact on the performance on the particular stage. When such a change is introduced collectively and appropriately in a multi-stage compressor, the overall full compressor performance can attain a targeted change. As disclosed herein, improvements to stator vane angle can improve compressor performance, and therefore engine performance, during hot day or increased ambient engine operating conditions. As used herein, a hot day ambient condition can refer to a day having ambient temperatures in excess of standard reference condition referred to as ISO (International Standards Office) condition. Similar modifications for cold day operation may also be made to enhance the compressor efficiency of the gas turbine engine if that is the desired objective.

Industrial Gas Turbines are designed for delivering specific engine performance (Engine Output Power and Engine Thermal Efficiency) targets at ISO ambient conditions. This condition is an international standard where the ambient pressure is at Sea-Level altitude condition (Po=14.696 psia), and ambient temperature at (To=59° F.). A Gas Turbine performance, no matter how it is designed, varies significantly at different ambient temperatures. This is referred to in the industry as "Ambient Lapse Rate" of Engine Power and Thermal Efficiency. Lapse rate curves are engine specifications published by gas turbine manufacturers to their customers and they are unique for each engine model. Although engine ambient lapse rate is defined by continuous curves as a function of ambient temperature, certain values of ambient temperatures are sometimes referred to in performance tables or contractual language. Such commonly referred to ambient temperatures aside from ISO (59° F.) condition are: Hot Day=95° F., Very Hot Day=122° F., Super Hot (Unrealistic) Day=140° F. Cold ambient temperatures go down to 32° F., 0° F., and Sub-Zero levels.

Figure 1:
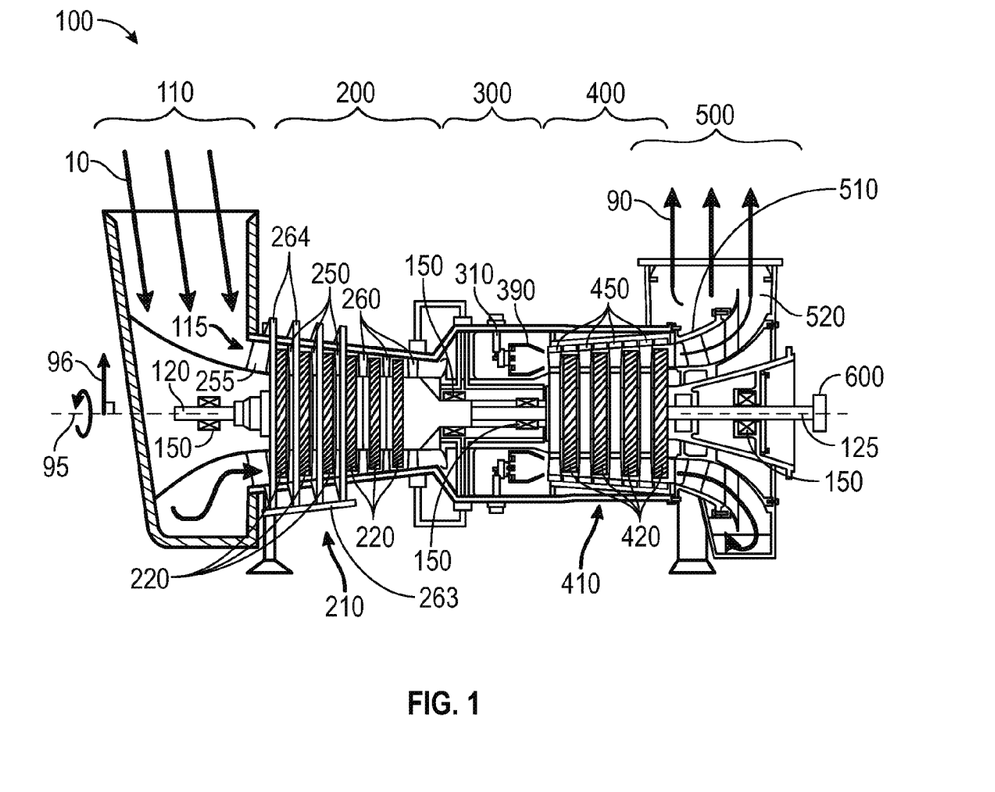
FIG. 1 is a schematic illustration of an exemplary gas turbine engine.

FIG. 1 is a schematic illustration of an exemplary gas turbine engine. Some of the surfaces have been left out or exaggerated (here and in other figures) for clarity and ease of explanation. Also, the disclosure may reference a forward and an aft direction. Generally, all references to "forward" and "aft" are associated with the flow direction of primary air (i.e., air used in the combustion process), unless specified otherwise. For example, forward is "upstream" relative to primary air flow, and aft is "downstream" relative to primary air flow.

In addition, the disclosure may generally reference a center axis 95 of rotation of the gas turbine engine, which may be generally defined by the longitudinal axis of its shaft or shafts (supported by a plurality of bearing assemblies 150). The center axis 95 may be common to or shared with various other engine concentric components. All references to radial, axial, and circumferential directions and measures refer to center axis 95, unless specified otherwise, and terms such as "inner" and "outer" generally indicate a lesser or greater radial distance from, wherein a radial 96 may be in any direction perpendicular and radiating outward from center axis 95.

A gas turbine engine 100 can have an inlet 110, a compressor 200, a combustor 300, a turbine 400, an exhaust 500, and a power output coupling 600.

The compressor 200 includes a compressor rotor assembly 210, compressor stationary vanes 250, and inlet guide vanes 255. As illustrated, the compressor rotor assembly 210 is an axial flow rotor assembly. The compressor rotor assembly 210 includes one or more compressor disk assemblies 220. Each compressor disk assembly 220 includes a compressor rotor disk that is circumferentially populated with compressor rotor blades. The compressor stationary vanes 250 include one or more stator vane assemblies 260. Each stator vane assemblies 260 can axially follow each of the compressor disk assemblies 220. Each compressor disk assembly 220 paired with the adjacent compressor stationary vanes 250 that follow the compressor disk assembly 220 is considered a compressor stage. The compressor 200 can have multiple compressor stages.

Inlet guide vanes 255 axially precede the compressor stages. Inlet guide vanes 255 are variable guide vanes. The inlet guide vanes 255 can each be rotated about the axis of the inlet guide vane 255. Along with the inlet guide vanes 255, the first few stages of the compressor stationary vanes 250 may also be variable guide vanes. In the embodiment illustrated, compressor 200 includes three stages of compressor stationary vanes 250 that include variable guide vanes located axially aft of inlet guide vanes 255, the three stages of stators being the first three stages of compressor 200.

The combustor 300 includes one or more fuel injectors 310 and includes one or more combustion chambers 390. The fuel injectors 310 may be annularly arranged about center axis 95.

The turbine 400 includes a turbine rotor assembly 410, and turbine nozzles 450. As illustrated, the turbine rotor assembly 410 is an axial flow rotor assembly. The turbine rotor assembly 410 may include one or more turbine disk assemblies 415. Turbine disk assemblies 415 each include a turbine disk that is circumferentially populated with turbine blades.

A turbine nozzle 450 axially precedes each of the turbine disk assemblies 415. Each turbine disk assembly 415 paired with the adjacent turbine nozzle 450 that precedes the turbine disk assembly 415 is considered a turbine stage. Turbine 400 includes multiple turbine stages.

Turbine 400 also includes a gas producer section 420 and a power turbine section 425. Gas producer section 420 and power turbine section 425 may each include one or more turbine stages.

Gas turbine engine 100 may include a single or dual shaft configuration. In the embodiment illustrated, gas turbine engine 100 includes a gas producer shaft 120 and a power turbine shaft 125. The gas producer shaft 120 mechanically couples to compressor rotor assembly 210 and to turbine disk assemblies 415 in gas producer section 420. The Power turbine shaft 125 couples to turbine disk assemblies 415 in power turbine section 425. Power turbine shaft 125 may also include power output coupling 600.

The exhaust 500 includes an exhaust diffuser 520 and an exhaust collector 550.

Figure 2:
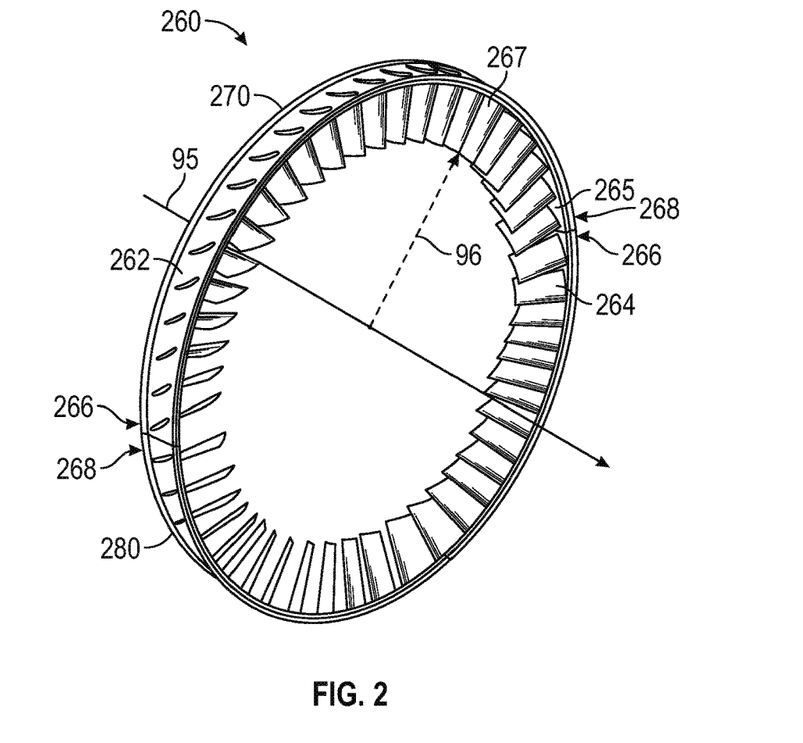
FIG. 2 is a perspective view of a stator ring assembly of the turbine of FIG. 1.

FIG. 2 is a perspective view of a stator vane assembly of the turbine of FIG. 1. The compressor stationary vanes 250 (FIG. 1), also referred to herein as fixed stator vanes (FSV) can be formed as a plurality of stator vane assemblies 260. Each stator vane assembly 260 of the compressor stationary vanes 250 can be unique for each stage of the multi-stage compressor 200. The stator vane assemblies 260 may also be referred to herein as a stator bladerow. Each compressor stage can have a stator vane assembly 260 that follows a compressor rotor assembly 220 along the center axis 95. Accordingly, the center axis 95 can extend through the center of the stator vane assembly 260 and each adjacent rotor disk assembly 220.

Each stator vane assembly 260 can have a stator assembly ring 262 and a plurality stator vanes 264 distributed radially about an inner surface 265 of the stator assembly ring 262. Only one of the stator vanes 264 is labeled for convenience. In contrast to the variable inlet guide vanes 255, the stator vanes 264 are permanently affixed to the stator assembly ring 262 in a fixed angular stagger position. The inner surface 265 can cover the interior perimeter of the stator assembly ring 262. In some embodiments, the stator assembly ring 262 can be a cylindrical construction having a plurality of perforations (FIG. 4) formed or punched into the stator assembly ring 262, each sized to accept a root end 267 of the stator vane 264. During manufacturing, each stator vane 264 can be fit into a perforation in the stator assembly ring 262 and brazed or otherwise fastened in place to form the stator vane assembly 260.

The stator assembly ring 262 can have an assembly ring upper portion 270 and an assembly ring lower portion 280. Each of the assembly ring upper portion 270 and the assembly ring lower portion 280 can have a first end 266 and a second end 268. The assembly ring upper portion 270 and the assembly ring lower portion 280 can be similarly formed and joined together at the first end 266 and the second end 268 to form the stator vane assembly 260 and surround the center axis 95 when installed in the gas turbine engine 100. Accordingly, the assembly ring upper portion 270 and the assembly ring lower portion 280 can be two halves of the stator ring assembly 260. The assembly ring upper portion 270 and the assembly ring lower portion 280 can be joined together by flowpath pins (not shown). In some examples, the stator vane assembly 260 can be constructed as a full ring by inserting the individual stator vanes 264 and brazing them firmly into the full stator assembly ring 262. At the end of the process, the complete stator assembly ring 262 can be precision cut into the two halves (e.g., the assembly ring upper portion 270 and the assembly ring lower portion 280) for ease of assembly/removal from compressor case during engine build.

Figure 3:
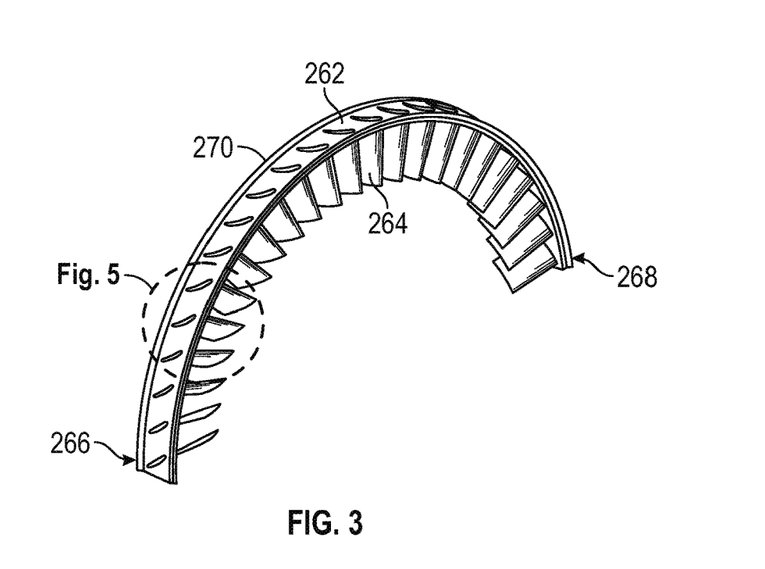
FIG. 3 is a perspective view of a portion of the stator ring assembly of FIG. 2.

FIG. 3 is a perspective view of the assembly ring upper portion of the stator vane assembly of FIG. 2. As noted above, the stator vane assembly 260 can have the assembly ring upper portion 270 and the assembly ring lower portion 280. The two portions can be manufactured as a full stator vane assembly 260 and then cut in half, as noted above. In other embodiments, the two portions can be manufactured separately to facilitate assembly of the gas turbine engine 100. The assembly ring upper portion 270 and the assembly ring lower portion 280 can be formed from one or more horizontal cylindrical sections.

Figure 4:
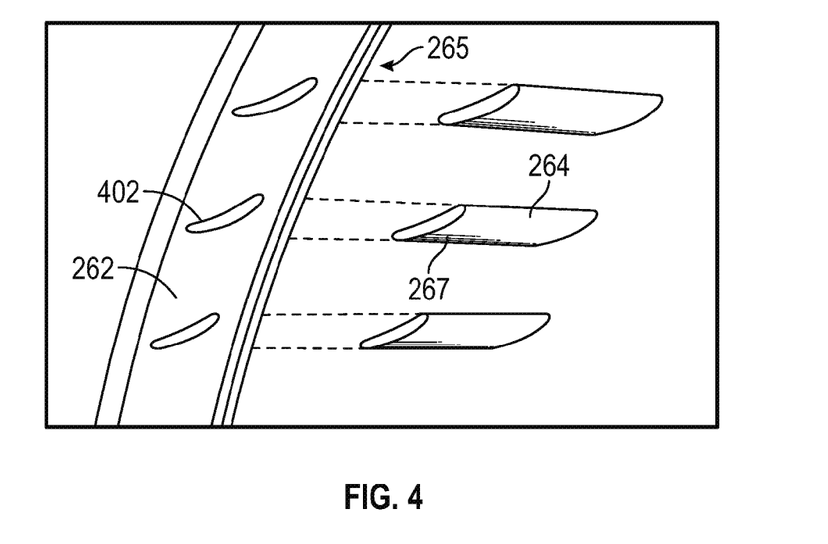
FIG. 4 is an exploded view of a portion of the assembly ring upper portion of FIG. 3.

FIG. 4 is an exploded view of a portion of the assembly ring upper portion of FIG. 3. A plurality of perforations 402 can be stamped or otherwise formed in the stator assembly ring 262. The perforations can be stamped by a punch tool in a shape resembling the specific vane (e.g., the stator vanes 264) airfoil shape and positioned to the desired vane setting or stagger angle. The perforations 402 can be slightly larger than the individual stator vanes 264 to allow for vane insertion before brazing. The perforations 402 can be evenly spaced about the inner surface 265 and receive the root end 267 of the stator vanes 264. The number of the perforations 402 is equal to the desired design number of stator vanes 264 for each particular compressor stage. In some embodiments, a stamp or a press punch tool can be used to form the perforations 402 in the stator assembly ring 262. The stamp or press can create precise and uniform perforations 402 around the stator assembly ring 262.

The stator vanes 264 of a first stator vane assembly 260 are all the same geometry and size. However, the geometry and size can be different than the stator vanes 264 of a second stator vane assembly in another compressor stage. Each stage's stator vane assembly 260 can have a unique stator airfoil shape, stagger angle, and airfoil count in the particular to the compressor stage by design. These characteristics can also be different for each compressor stage depending on the aerodynamic and structural design requirements. The stator vanes 264 can have varying sizes and shapes. The stator vanes 264 are depicted as an airfoil with relatively uniform chord length. However, the stator vanes 264 can have various geometries and sizes including varying span-wise chord length and varying degrees of axial and tangential sweep, bow, and/or twist along the span or stacking axis of the stator vane 264. The stator vanes 264 can have other complex three-dimensional airfoil shapes depending on the compressor design. The stator vanes 264 are placed symmetrically and uniformly around the circumference (e.g., the inner surface 265) of the full stator assembly ring 262.

Figure 5:
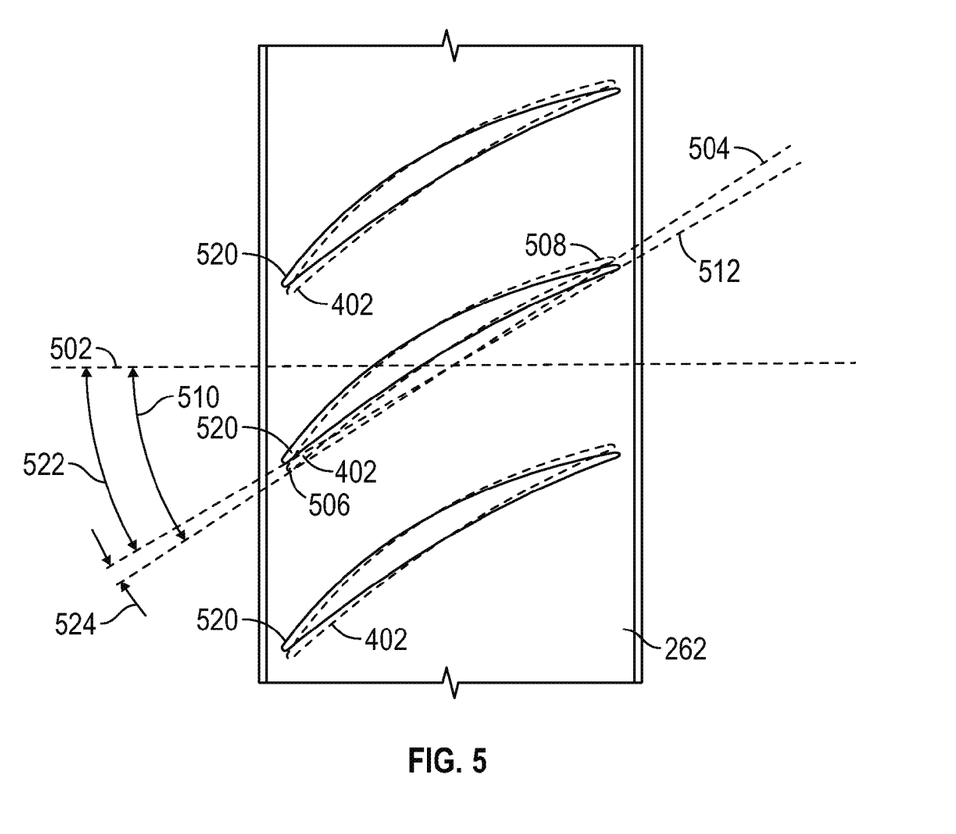
FIG. 5 is a detailed plan view of a portion of the assembly ring of FIG. 3

FIG. 5 is a detailed plan view of a portion of the assembly ring of FIG. 3. A portion of the stator assembly ring 262 is shown which includes outline of three perforations 402. The outlines of the three perforations 402 are depicted in dashed lines. In this view, the stator vanes 264 are not installed in the perforations 402. The outlines are shown as a reference for improved perforations 520, described below.

A reference line 502 is shown bisecting the section of the stator assembly ring 262 in a horizontal direction. The reference line 502 is parallel to the center axis 95 (FIG. 1) and is coincident with the inner surface 265. The reference line 502 can be used herein as a reference to describe a vane angle. As used herein, vane angle, vane stagger, or vane setting is a measure of the angle between a chord line 504 of the perforations 402 and the reference line 502, and by extension via the radial 96, the center axis 95. The chord line 504 is an imaginary line extending through a leading edge 506 and a trailing edge 508 of the perforations 402. Accordingly, a first vane angle 510 (e.g., vane stagger angle) can describe the angle between the reference line 502 and the chord line 504. The vane stagger angle (e.g., the first vane angle 510) can be set to hold the stator vanes 264 at a specific absolute angular position at the fixed root portion (e.g., the root end 267) of the vane (e.g., the root end 267) into stator assembly ring 262.

Every stator vane 264 in a given stator vane assembly 260 has the same first vane angle 510. This can determine an inlet flow swirl angle (not shown) that describes the effect of the stator vanes 264 on the working fluid (e.g., the air 10) that is incident on the leading edge of the stator vanes 264. This is also referred to as inflow angle of attack or incidence angle of the rotor airfoil directly downstream of a given stator vanes assembly 260. Changing the vane angle 510 can directly affect the inlet swirl flow angle of the rotor bladerow air foils (e.g., the compressor disk assembly 220) immediately downstream for the stator bladerow causing a change in the aerodynamic performance characteristics of the rotor bladerow and thus the compressor stage, and the efficiency of compressor 200 and the performance of the gas turbine engine 100 as a whole. It should be appreciated that any change in a bladerow (rotor and/or stator) in a multi-stage compressor, may result in a change in the overall full compressor aerodynamic performance reflecting the associated change in the particular bladerow, but more importantly the cascaded reactions of all bladerows of the multi-stage compressor system as a whole.

In some embodiments, certain enhancements to compressor airflow, pressure ratio, and compressor efficiency can be realized by changing the vane angle of the stator vanes 264. For example, the stamp or punch used to form the perforations 402 can be changed slightly to either open or close the vane angle, in relation to the reference line 502. Increasing the vane setting angle or stagger can close the stator vanes 264, moving the stagger or vane angle further away from the axial direction (e.g., the axis 95) and decreasing in the incidence angle on the downstream compressor disk assembly 220. This can drive the downstream compressor disk assembly 220 to operate closer to a "choke" side of its performance characteristics. Similarly, the stator vanes 264 that are closed can operate closer towards their choke side of performance characteristics. Effectively, the pumping capacity of the entire compressor stage (e.g., the compressor disk assembly 220 and the stator vane assembly 260) may reduce with an increase in stage surge margin. This can also affect the efficiency of a given compressor stage. Conversely, decreasing the vane setting or stagger angle can open the stator vanes 264, increasing the incidence angle of the individual stator vanes 264 and driving the compressor stage away from the choke side (and toward stall side) of its performance characteristics. This can increase the pumping capacity of the compressor stage.

Accordingly, a plurality of improved perforations 520 can be formed in the stator assembly ring 262. The improved perforations 520 are shown in a solid black line with a slight angular deflection from the perforations 402. In some embodiments, the improved perforations 520 can have vane angle 522 between a chord line 512 of the improved perforations 520 and the reference line 502. The improved perforations 520 then have a vane angle difference 524 from the first vane angle 510. In some examples, the vane angle difference 524 can be two to 10 degrees in the open or closed direction, depending on a particular design. In some other embodiments, the vane angle difference can be 2, 3, 4, 5, 6, 7, 8, 9, or 10 degrees and any fraction of an angle therebetween. For some applications, the change in vane angle, and corresponding flow inlet swirl angle, can be small enough (e.g., 3 degrees more open) so as not to cause an adverse effects on a single (modified) stage, but can provide a large cumulative effect when applied to multiple FSV compressor stages (e.g., the compressor stationary vanes 250). The cumulative effect can be strong enough to move the stall-controlling forward compressor stages away from a respective near-stall condition at lower corrected compressor speeds (e.g., Hot Day condition). At such lower speeds, the front compressor stage(s) increase toward peak efficiency, coinciding with a significant increase in flow, minimal reduction in pressure ratio, and significant increase in stage efficiency and stage surge margin. This results in a net full-compressor improvement at the lower speed and hotter day operation. The increase of pressure ratio of all the improved compressor stages with the modified perforations 502 more than compensates for the minimal reduction in front compressor stage(s) pressure ratio. Thus the full compressor 200 can operate a higher overall pumping capacity, efficiency, and surge margin at the off-design conditions, such as a lower corrected speed, hot day conditions.

The same vane angle difference 524 can be applied to all stator vanes 264 for one or more selected stator vane assemblies 260 in multiple compressor stages. In some examples, all of the FSV compressor stages can be improved using the vane angle difference 524. New stator assembly rings 262 can be manufactured using the improved vane angle 520 instead of the first vane angle 510. The new stator ring assemblies can then be installed in the compressor 200 to retrofit the gas turbine engine 100 for improved hot day performance. Compressor stages that are retrofitted with stator vane assemblies 260 having the improved perforations 520 may be referred to herein as "improved stator vane assemblies," "improved stator bladerows," "modified compressor stages," or "improved compressor stages."

The design of the compressor, including variations in vane angles from the front of a compressor to the back of a compressor can be optimized for certain operating environments. For example, some compressors are optimized for cold environments and do not operate at peak efficiency when the ambient temperature rises. Similarly, compressors engineered for hot environments may not function as designed in colder environments.

When a given compressor 200 and a fixed engine operating line (set by a given hot section flow capacity) is operated at hotter-than-normal ambient conditions, its aerodynamic inlet corrected speed (or Acoustic rotational speed) reduces relative to its design speed. This can drive the front stages of the compressor 200 to operate closer to the stall side of their characteristics while the rear stages are driven to operate closer to the choke side of their characteristics. In some examples, variable setting angle vanes (stators) in the front stages such as, for example, the inlet guide vanes 255 or other variable guide vanes (VGV) can mitigate these effects in axial compressors. At lower corrected speeds, these vanes (e.g., inlet guide vanes 255) are actuated to a more closed position reducing the pumping capacity of these stages and (moving the entire characteristic down in flow size) thus alleviating the match near stall. This can maintain robust operability (surge margin) of the stage/compressor at the expense of lower flow capacity/engine power. At lower corrected speeds, the front stages of the compressor 200 become subsonic stages and their characteristic flow ranges from choke to stall become significantly wider than at ISO design conditions where these front stages are transonic. Passage shocks in transonic stages hold the flow near constant as the stage loading moves from choke to stall conditions. Aerodynamic losses of a row of airfoils increase towards choke and stall sides of their characteristics, with minimum loss region somewhere in the middle away from these conditions. Stage efficiency (e.g., compressor disk assembly 220 and corresponding stator vane assembly 260) peaks when both bladerows are matched at their min loss region.

Figure 6:
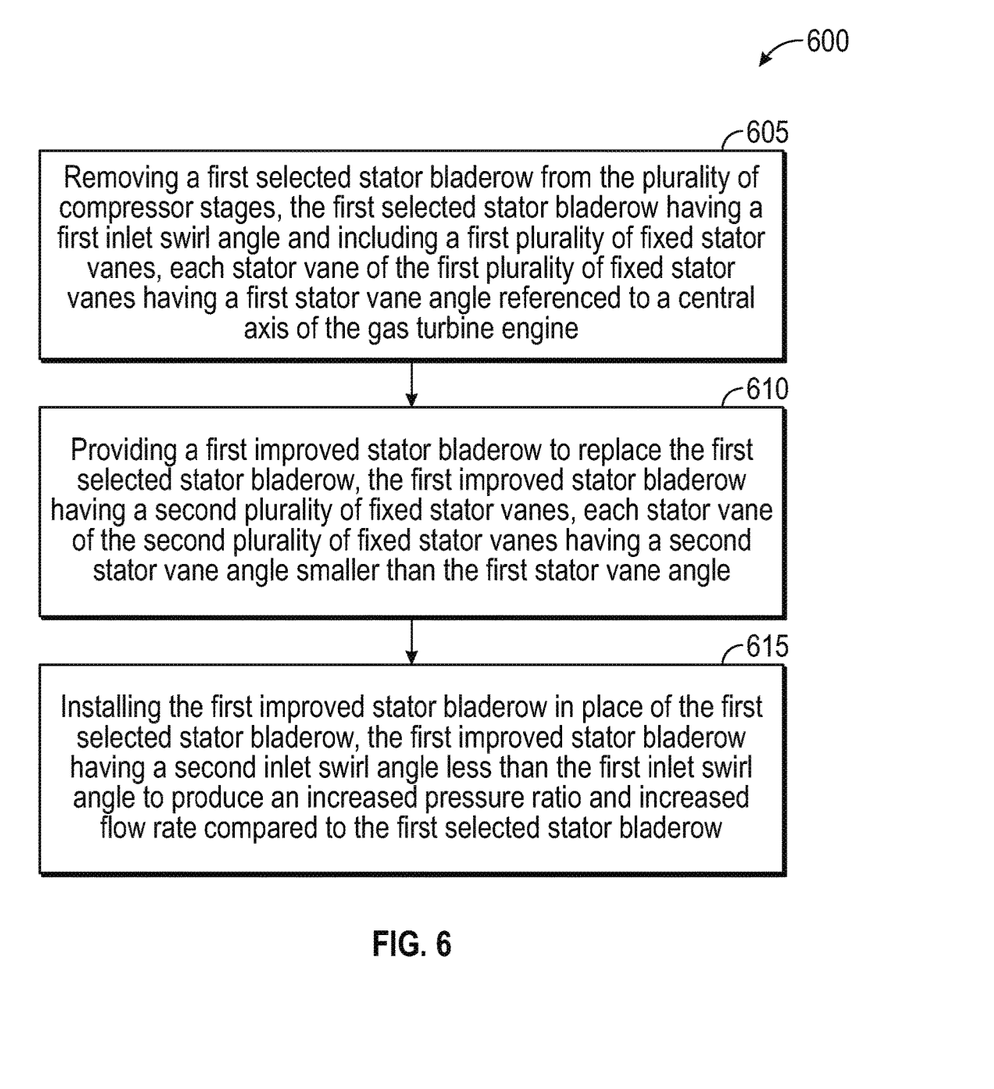
FIG. 6 is a flowchart of a method for servicing the gas turbine engine of FIG. 1 to enhance the power output of the gas turbine engine.

FIG. 6 is flowchart of a method for servicing the gas turbine engine of FIG. 1 to enhance the power output of the gas turbine engine. A method 600 can be used to retrofit a gas turbine engine to improve efficiency of operation in high ambient temperatures. As used herein high ambient temperatures can refer to hot-day conditions, or conditions in excess of 95 degrees Fahrenheit.

At block 605 a first selected stator bladerow can be removed from the plurality of compressor stages. The first selected stator bladerow can have a first inlet swirl angle and a first plurality of fixed stator vanes. Each stator vane in the first selected bladerow can have a first stator vane angle referenced to a central axis of the gas turbine engine.

At block 610, the method 600 can provide a first improved stator bladerow, or improved stator blade assembly. The first improved stator blade assembly (bladerow) can replace the first selected stator bladerow. Each stator vane in the first improved stator vane assembly can be inserted in a perforation in the stator assembly ring. The perforation can described the second stator vane angle that is less that the first stator vane angle.

At block 615, the method 600 can include installing the first improved stator bladerow in place of the first selected stator bladerow. The method 600 can be repeated multiple times to replace a second selected stator bladerow with a second improved stator bladerow, and so on. The stator vane angle of the improved stator bladerows can be two, three, four, five, or more degrees more open than the vane angle of the stator bladerow being replaced. Similarly, the inlet flow angle of the compressor stages having improved stator bladerows can also be more open (e.g., closer to stall conditions) than the bladerows being replaced. Replacing multiple stator bladerows in the compressor 200 can improve compressor efficiency, flow, and power ratio in the gas turbine engine 100 during operations in hotter than normal ambient temperatures. In some examples, such ambient temperatures can be ISO hot day conditions in excess of 95 degrees Fahrenheit.

One or more of the above components (or their subcomponents) may be made from stainless steel and/or durable, high temperature materials known as "superalloys." A superalloy, or high-performance alloy, is an alloy that exhibits excellent mechanical strength and creep resistance at high temperatures, good surface stability, and corrosion and oxidation resistance. Superalloys may include materials such as HASTELLOY, INCONEL, WASPALOY, RENE alloys, HAYNES alloys, INCOLOY, MP98T, TMS alloys, and CMSX single crystal alloys.

INDUSTRIAL APPLICABILITY

Gas turbine engines may be suited for any number of industrial applications such as various aspects of the oil and gas industry (including transmission, gathering, storage, withdrawal, and lifting of oil and natural gas), the power generation industry, cogeneration, aerospace, and other transportation industries.

Referring to FIG. 1, a gas (typically air 10) enters the inlet 110 as a "working fluid" and passes through inlet guide vanes 255. Inlet guide vanes 255 may control the amount of the working fluid that enters compressor 200. The working fluid is then compressed by the compressor 200. In the compressor 200, the working fluid is compressed in an annular flow path 115 by the series of compressor disk assemblies 220. In particular, the air 10 is compressed in numbered "stages," the stages being associated with each compressor disk assembly 220. For example, "4th stage air" may be associated with the 4th compressor disk assembly 220 in the downstream or "aft" direction, going from the inlet 110 towards the exhaust 500). The stages that include compressor stationary vanes 250 with variable guide vanes may also control the amount of the working fluid that enters compressor 200.

Once compressed air 10 leaves the compressor 200, it enters the combustor 300, where it is diffused and fuel is added. Air 10 and fuel are injected into the combustion chamber 390 via fuel injector 310 and combusted. Energy is extracted from the combustion reaction via the turbine 400 by each stage of the series of turbine disk assemblies 415. Exhaust gas 90 may then be diffused in exhaust diffuser 520, collected and redirected. Exhaust gas 90 exits the system via an exhaust collector 550 and may be further processed (e.g., to reduce harmful emissions, and/or to recover heat from the exhaust gas 90).

Turbine engine design and resulting performance can be dependent, at least in part, on operating environment. The design of the compressor 200, for example, can be optimized for compressing the working fluid (e.g., the air 10) under a given set of environmental conditions. For example, certain engines can be designed for operation in standard day conditions (i.e., 59 degrees Fahrenheit at sea level), hot day conditions (95 degrees Fahrenheit), very hot day conditions (122 degrees Fahrenheit), or cold day conditions (32 degrees Fahrenheit). Other types of conditions are possible.

However, the gas turbine engine 100 may not always be operated in the environment for which it was designed or intended for use. Climates can also change. Accordingly, certain retrofits for existing compressors can increase pressure ratio and flow rate for certain implementations being operated other-than-designed environments, for example, a hotter than normal environment.

In some embodiments, the introduction of small variations of inlet swirl angle, as shown in FIG. 5, in multiple consecutive stages of the compressor 200 can improve engine performance on a hot day. The changes in vane angle can be implemented in one or more compressor stages starting few stages downstream of the front stages all the way to the last stage of the multi-stage axial compressor. The turbine engine 100 can have in excess of 10 compressor stages. The new stator vane angle (e.g., the vane angle 522) can be implemented, for example, downstream of the front transonic compressor stages.

The change in rotor inlet swirl angle is introduced by decreasing the vane angle (e.g., more towards axial direction) of the fixed stator vanes 264 of these stages. It has been shown that a change of two, three, or four degrees can result in an increase of rotor inlet flow angle of attack (or Incidence Angle in the relative frame of reference) which manifests as an increase of the pumping capacity of the given stage with a commensurate increase in flow and pressure ratio. As shown in FIG. 5, this change can be introduced to the stator vane assembly 260 using the improved perforations 520. This slight change is small enough not to cause any unintended adverse consequences of any single improved/modified stage but increases the pumping capacity of each selected compressor stage having the stator vane assembly 260 with the improved perforations 520. This arrangement can take advantage of the high compressor stage count in industrial gas turbine compressors, multiplying the effect with each compressor stage. While each improved or modified compressor stage may individually have a small change, the cumulative effect of all stages working together can have very large impact on the stall/surge limited forward compressor stages (limiting at hot day/low speed) forcing them to match away from stall. This can overwhelm the controlling front stages to match away from the near stall side of their characteristics and closer towards peak efficiency.

As ambient temperature increases toward hot day conditions and lower corrected speed conditions, the decreased angle of the improved perforations 520 can decrease aerodynamic loading on the front compressor stages. The compressor stages forward of the modified compressor stages can then operate in subsonic conditions and rematch at high airflow and very slightly lower pressure ratio, higher stage efficiency, and increased stage surge margin. The collective increase of pressure ratio the modified stator vane stages more than compensates for the loss of pressure ratio in the front compressor stages. With the aft compressor stages matched away from choke conditions, the front stages are not restricted to passing higher flow through the full compressor. Therefore, the overall multi-stage axial compressor will result in higher flow rate, higher pressure ratio, higher efficiency, and increased surge margin at the higher ambient temperatures and lower corrected speed operating conditions.

At design speed (ISO condition), the stator vane assembly modification has little to no impact on overall compressor flow rate since at these speeds the front stages are transonic and their characteristics are nearly flat vertical. With these stages already matched at their choke side of their characteristics, they will match further down on the vertical speedline resulting in lower efficiency in these stages. The reduction of efficiency in the few front stages at ISO conditions has less weighted impact on overall compressor efficiency since modified stator bladerow efficiencies do not change much under this condition. Therefore, there may be a slight trade off in compressor performance penalty at ISO condition relative to the impressive performance gains at hot ambient conditions. The performance penalty will get larger at cold ambient conditions and may be significant at extreme ambient temperatures.

The servicing or modifications disclosed herein may result in a relatively inexpensive improvement to the existing power ratio and efficiency the compressor 200 of the gas turbine engine 100 by modifying the inlet swirl angle of fixed stator vanes in the multiple compressor stages. The servicing may include, inter alia, overhauling, field modifying, retrofitting, or refurbishing the gas turbine engine 100.

Those of skill will appreciate that the various illustrative logical blocks, modules, units, and algorithm steps described in connection with the embodiments disclosed herein can often be implemented as electronic hardware, computer software, or combinations of both. To clearly illustrate this interchangeability of hardware and software, various illustrative components, blocks, modules, and steps have been described above generally in terms of their functionality. Whether such functionality is implemented as hardware or software depends upon the particular constraints imposed on the overall system. Skilled persons can implement the described functionality in varying ways for each particular system, but such implementation decisions should not be interpreted as causing a departure from the scope of the invention. In addition, the grouping of functions within a unit, module, block, or step is for ease of description. Specific functions or steps can be moved from one unit, module, or block without departing from the invention.

The preceding detailed description is merely exemplary in nature and is not intended to limit the invention or the application and uses of the invention. The described embodiments are not limited to use in conjunction with a particular type of gas turbine engine. It will be appreciated that the gas turbine engine in accordance with this disclosure can be implemented in various other configurations. Furthermore, there is no intention to be bound by any theory presented in the preceding background or detailed description. It is also understood that the illustrations may include exaggerated dimensions to better illustrate the referenced items shown, and are not consider limiting unless expressly stated as such.

What is claimed is:

1. An improved stator vane assembly for increasing an efficiency of a compressor of a gas turbine engine, the compressor having a first stator vane assembly selected for replacement, the first stator vane assembly having a first plurality of fixed stator vanes, each fixed stator vane of the first plurality of fixed stator vanes having a first vane angle relative to a center axis of the gas turbine engine, the improved stator vane assembly comprising:
    an improved stator assembly ring having a central axis surrounded by an interior surface forming a cylindrical surface of revolution and having a plurality of perforations formed around an inner perimeter of the improved stator assembly ring;
    a second plurality of stator vanes inserted into the plurality of perforations and brazed to the improved stator ring assembly, wherein each stator vane of the second plurality of stator vanes has a second vane angle less than the first vane angle when inserted into the plurality of perforations, and
    wherein the compressor produces an increased power ratio and increased flow rate when the improved stator vane assembly is used in place of the first stator vane assembly.

2. The improved stator vane assembly of claim 1, wherein the improved stator assembly ring has an assembly ring upper portion and an assembly ring lower portion identical to the assembly ring upper portion.

3. The improved stator vane assembly of claim 1, wherein the improved stator vane assembly improves compressor efficiency, power ratio, and flow rate in ambient conditions that are hotter than the design considerations for the compressor with the first stator vane assembly installed.

4. The improved stator vane assembly of claim 1, wherein second stator vane angle is three degrees less than the first stator vane angle.

5. An improved stator vane assembly for increasing an efficiency of a compressor of a gas turbine engine, the compressor having a first stator vane assembly selected for replacement, the first stator vane assembly having a first plurality of fixed stator vanes, each fixed stator vane of the first plurality of fixed stator vanes having a first vane angle relative to a center axis of the gas turbine engine, the improved stator vane assembly comprising:
    an improved stator assembly ring having a central axis surrounded by an interior surface forming a cylindrical surface of revolution and having a plurality of perforations formed around an inner perimeter of the improved stator assembly ring;
    a second plurality of stator vanes are inserted into the plurality of perforations and brazed into the plurality of perforations, wherein each stator vane of the second plurality of stator vanes has a second vane angle less than the first vane angle when inserted into the plurality of perforations, and
    wherein the compressor produces an increased power ratio and increased flow rate when the improved stator vane assembly is used in place of the first stator vane assembly.

6. The improved stator vane assembly of claim 5, wherein second stator vane angle is three degrees less than the first stator vane angle.

7. An improved stator vane assembly for increasing an efficiency of a compressor of a gas turbine engine, the compressor having a first stator vane assembly selected for replacement, the first stator vane assembly having a first plurality of fixed stator vanes, each fixed stator vane of the first plurality of fixed stator vanes having a first vane angle relative to a center axis of the gas turbine engine, the improved stator vane assembly comprising:
    an improved stator assembly ring having a central axis surrounded by an interior surface forming a cylindrical surface of revolution and having a plurality of perforations formed around an inner perimeter of the improved stator assembly ring;
    a second plurality of stator vanes for insertion into the plurality of perforations, wherein each stator vane of the second plurality of stator vanes has a second vane angle three degrees less than the first vane angle when inserted into the plurality of perforations, and
    wherein the compressor produces an increased power ratio and increased flow rate when the improved stator vane assembly is used in place of the first stator vane assembly.

8. The improved stator vane assembly of claim 7, wherein the second plurality of stator vanes are brazed into the plurality of perforations.

* * * * *